United States Patent [19]

Golino et al.

[11] Patent Number: 5,215,690
[45] Date of Patent: Jun. 1, 1993

[54] METHOD OF MAKING ACTIVATED CARBON AND GRAPHITE STRUCTURES

[75] Inventors: Carlo M. Golino, Evergreen, Colo.; Sandra L. Hagg, Corning, N.Y.; Irwin M. Lachman, Corning, N.Y.; Lawrence A. Nordlie, Corning, N.Y.

[73] Assignee: Corning Incorporated, Corning, N.Y.

[21] Appl. No.: 632,922

[22] Filed: Dec. 24, 1990

[51] Int. Cl.$^5$ ............... B29C 67/20; C01B 31/02; C01B 31/04
[52] U.S. Cl. ............... 264/29.6; 264/29.7; 264/44; 264/82; 264/85; 264/177.12; 264/177.18; 264/177.19; 264/211.2
[58] Field of Search ............... 264/29.4, 29.6, 29.7, 264/44, 82, 85, 105, 177.11, 177.12, 177.18, 177.19, 211.2, 236

[56] References Cited

U.S. PATENT DOCUMENTS

| | | | |
|---|---|---|---|
| 3,089,195 | 5/1963 | Woodburn, Jr. | 264/29.7 |
| 3,201,330 | 8/1965 | Price | 264/29.7 |
| 3,632,385 | 1/1972 | Schmitt et al. | 427/228 |
| 3,790,654 | 2/1974 | Bagley | 264/177.11 |
| 3,825,460 | 7/1974 | Yoshikawa et al. | 156/296 |
| 3,859,421 | 1/1975 | Hucke | 423/445 |
| 3,927,186 | 12/1975 | Vinton et al. | 423/447.1 |
| 4,399,052 | 8/1983 | Sugino | 502/402 |

Primary Examiner—Leo B. Tentoni
Attorney, Agent, or Firm—Gary H. Levin; Richard N. Wardell

[57] ABSTRACT

A method of forming an activated carbon or graphite structure is provided by (1) forming, such as extrusion, of a plasticized mixture of: binder selected from cellulose ether and derivative thereof, starch, and mixture thereof; furfuryl alcohol and/or polyfurfuryl alcohol; and carbon, graphite, or a carbon-containing material; and (2) subjecting the formed mixture to a carbon-forming pyrolysis step. The use of furfuryl alcohol allows extrusion at ambient temperatures and provides a "reactive" solvent that provides carbon upon pyrolysis.

23 Claims, 3 Drawing Sheets

METHOD OF MAKING ACTIVATED CARBON AND GRAPHITE STRUCTURES

BACKGROUND OF THE INVENTION

This invention is directed to making structures of carbon or a carbonaceous material, and more particularly to the preparation of thin-walled and/or porous structures such as honeycombs or ribbons by die-extrusion or other forming processes using carbon pre-cursors as functional ingredients in the formable mixture.

Activated carbon and graphite honeycomb structures are well known in the art. Such structures have been used as supports for catalysts having high surface areas, adsorbent surfaces, filters, etc. For example, Hucke, U.S. Pat. No. 3,859,421, discloses methods of producing carbonaceous bodies by casting a mixture containing carbon-yielding binders such as furfuryl alcohol and furfuryl alcohol resins, polymerizing the alcohol by exposure to mineral acids or organic acids, consolidating the mixture by removal of liquids, and pyrolyzing at temperatures of 250° C. to 2400° C. to generate carbon.

Sugino, U.S. Pat. No. 4,399,052, discloses the extrusion of a mixture containing a thermosetting organic resin into a honeycomb structure which is then dried to eliminate hydrocarbons and effect carbonization, followed by heating to 600°–1000° C. in an oxidizing atmosphere to form an activated carbonaceous honeycomb body.

Although the above-described references, as well as other methods known in the art, provide strong and functional activated carbon structures which perform well in their variously known uses, the methods heretofore used were not altogether efficient. In some, the extrusion or casting into the original shape is required to be performed at an elevated temperature. In others, the solvent originally used to plasticize the mixture to be extruded or casted required removal, a process which can result in unwanted void space, further requiring consolidation or densification to be performed prior to carbon activation.

SUMMARY OF THE INVENTION

The present invention provides a method of making an activated carbon or graphite structure by forming (e.g. extrusion) of an appropriate formable mixture into a desired shape followed by a carbon-forming pyrolysis step. Admixture and forming of the formable mixture can be performed at ambient temperatures and compatible carbon-yielding materials are used in the formable mixture as a "reactive" solvent or liquid medium to plasticize or render formable the mixture for forming and to act as a permanent binder upon later firing.

According to the method of this invention, a structure, which advantageously can be porous and/or thin-walled, of carbonaceous material is prepared by (1) admixing into a substantially homogeneous mixture carbon, carbon precursor, graphite, or mixture thereof; binder selected from cellulose ether and derivative thereof, starch, and mixture thereof; and furfuryl alcohol, polyfurfuryl alcohol, or mixture thereof; (2) forming (e.g. extruding) the batch into a green (unfired) body having the shape of the desired structure; (3) exposing the extruded shape to a polymerizing agent for the furfuryl alcohol; and then (4) heating the extruded structure at a temperature and for a time sufficient to substantially convert the polymerized furfuryl alcohol to carbon.

In one embodiment of the invention, the carbonaceous structure is heat-treated in an oxidizing atmosphere in order to activate the carbon. In an alternative embodiment, graphitic or glassy carbon structures can be formed by heat-treatment under reducing conditions. In still further embodiments of the invention, the formable mixture contains other materials known for their high porosity, high surface area, and adsorptive ability, such as zeolites or other molecular sieves.

DETAILED DESCRIPTION OF THE INVENTION

Figure 1:
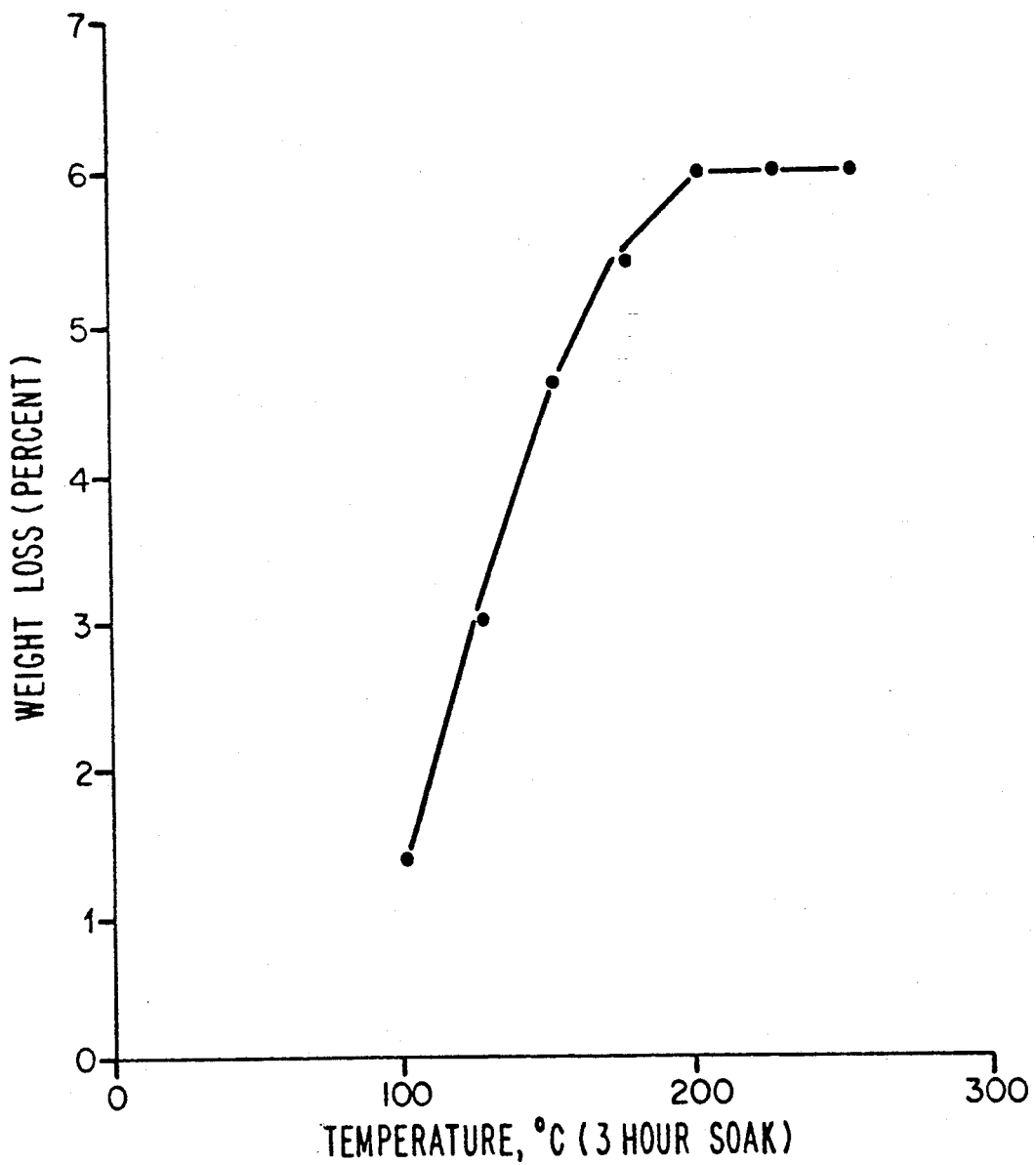
FIG. 1 is a plot of percent weight loss versus temperature for pre-fire burn out of volatiles for a structure made according to the invention.

In its presently preferred form, the present invention provides a method for preparing thin-walled carbonaceous structures through ambient-temperature extrusion techniques using certain carbon pre-cursors that function as both solvent and plasticizer for the preparation of a plastically formable mixture, especially an extrudable mixture. More particularly, the present invention is based, at least in part, on the use of furfuryl alcohol and/or a partially polymerized furfuryl alcohol both as the liquid medium and as a permanent binder for the structure, which is generated upon post-extrusion firing; and the use of cellulose ether or derivative thereof (e.g. methylcellulose), starch, or mixture thereof as a nonpolymerizing plasticizer and temporary binder in the mixture.

According to the method of the invention, a substantially homogeneous plasticized mixture is first made by admixing, according to conventional methods, the carbon and/or carbon-containing material to be incorporated into the structure. The three necessary ingredients for the admixture are (1) carbon, carbon precursor, graphite, or mixture thereof; (2) binder selected from cellulose ether and derivative thereof, starch, and mixture thereof; and (3) furfuryl alcohol, partially polymerized furfuryl alcohol, or mixture thereof.

Preferred forms of carbon are carbon black, including Murray-Williams Germantown lampblack, Fisher lampblack #198, and Columbian Carbon Germantown lampblack, all of which are commercially available. The carbon is preferably used in fine particulate form (known as "flour") that is −200 mesh, more preferably −325 mesh, and most preferably −500 mesh.

Representative carbon precursors are various nut flours (e.g. pecan flour and cherry pit flour), rice hulls and saw dust, all of which are known in the art and commercially available.

Graphite can also be added to the formable admixture. Commercially available, suitable forms of graphite are Asbury Graphite #4012, Superior Graphite #9026, Lonza KS-75 Graphite, and Asbury Graphite #7101. Generally, however, graphite does not constitute more than a minor portion of the carbon constituent if the final structure is to be subjected to an activating heat treatment, as described below. Where present, the graphite is incorporated in powdered form.

The formable mixture further contains binder selected from cellulose ethers, derivatives thereof, and/or starches to provide the necessary plasticization for extrusion and the wet strength required to maintain structural integrity of the extruded green shape. The cellulose ether type binder is generally selected from the group methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, sodium carboxylmethylcellulose, and mixture thereof. Preferred sources of cellulose ethers and derivatives thereof are the Dow Chemical Company's line of Methocel products. Particularly preferred is Methocel MC-4000, a methylcellulose. Methylcellulose is preferably present in an amount of about 1 to 20 weight percent, more preferably about 4 to 10 weight percent, of the formable admixture (defined for these purposes as the carbon constituent, the methylcellulose, and the furfuryl alcohol). Generally any known, substantially water soluble starch can be used, such as corn starch, potato starch, dextrin or other modified or synthetic starch.

The third essential ingredient of the formable admixture is furfuryl alcohol, partially polymerized furfuryl alcohol, or mixtures thereof, as the liquid medium that facilitates extrusion. The furfuryl alcohol functions as a reactive solvent or diluent, generating a permanent binder within the structure upon subsequent firing. The furfuryl alcohol component generally constitutes about 20 to 75 weight percent, preferably about 25 to 60 weight percent, of the formable admixture. Furfuryl alcohol, like water (but unlike most simple alcohols), is a suitable solvent for methylcellulose.

Various fillers can also be added to the mixture in order to impart specific characteristics or properties to the extruded or ultimately fired structure. For example, the addition of silica, silicone resin, or silicon powder will generate silicon carbide in the polymerized and fired body, imparting hardness. The presence of certain metallic oxides in the extruded mixture can act as catalyst for subsequent carbonization. Examples of suitable fillers are alumina, silica, spinel, titania, zirconia, zeolite, other molecular sieve, and mixture thereof. Preferably the oxides are calcined oxides having a surface area of at least about 20 m2/gm, more preferably at least about 50 m2/g, for applications requiring high surface area. Other suitable fillers include nitrides and carbides, such as nitrides or carbides of silicon or titanium. Fillers can be present in an amount up to about 75% by weight, preferably about 20–50% by weight, of the total weight of the formable admixture. Formation of the batch, with proper dispersion of the fillers, is enhanced by the addition of up to 3% by weight of a surfactant or dispersant. A preferred such material is sodium stearate.

The extrusion mixture and formation of the green shape are prepared by conventional techniques using conventional equipment. For example, the dry ingredients are first admixed and blended into a substantially homogeneous mixture by use of, for example, a ball-mill or a high intensity Littleford mixer, followed by addition of liquid ingredients and then by plasticization in a mix-muller or double-arm mixer. Following this plasticization step, the mixture can then be extruded through a "noodling" or spaghetti die one or more times to effect further mixing and to substantially homogenize the mixture. Ultimately, the mixture is formed into the desired shape by extrusion through a die capable of forming a structure such as a thin-walled structure which can be a honeycomb, ribbon, or other desired configuration. The preferred structure for the practice of this invention is a thin-walled honeycomb having at least 4 (0.6), preferably at least 100 (15.5), more preferably at least 200 (31), and most preferably at least 400 (62), through-and-through channels per square inch (per square centimeter) of frontal surface area, and a wall thickness of about 3–300 mils (0.08–7.6 mm).

Polymerization of the furfuryl alcohol and/or polyfurfuryl alcohol in the extruded green structures is then effected by contacting the structures with a suitable polymerizing agent. Such polymerizing agent can be selected from acid and any volatile molecule which can react hydrolytically with the hydroxyl moiety of the furfuryl alcohol and/or any residual water in the mixture to form an (strong) acid. Examples of such agents are: hydrochloric acid (hydrogen chloride) or vapors of such acid; alkylchlorosilanes such as dichloromethylsilane ($CH_3Cl_2SiH$), methyltrichlorosilane ($CH_3Cl_3Si$), and dimethyldichlorosilane [$(CH_3)_2SiCl_2$]; other chlorosilanes; silicon tetrachloride; boron trichloride; and acetyl chloride. Polymerization is carried out by placing the extruded structure into a closed vessel with the polymerizing agent such that the structure is in contact either with the agent itself, generally in liquid form, or with its vapors. The time necessary for polymerization to occur can vary from a few minutes to 5–10 hours, depending upon the agent employed and whether the structure is in contact with the liquid or vapor. Vapor-contact polymerization is preferred, despite the increased time required, because direct immersion in liquid polymerizing agent can result in an overly vigorous reaction that can adversely effect the integrity of the structure.

After polymerization, the green structures are heated at a temperature (e.g. 500°–1400° C.) and for a time (e.g. 1–24 hours) sufficient to substantially convert the polymerized furfuryl alcohol to carbon. As a first part of such heating, the structures are preferably pre-fired (sometimes called "burn out") to substantially eliminate any volatiles. This procedure can be carried out in air in a programmable electric kiln. The temperature is not particularly critical, but ordinarily is performed at about 90° to 250° C., preferably about 200°–250° C., for a period of from about 1 to 10 hours. The temperature of the structure is generally raised to the burn-out temperature slowly, at a rate of about 25° C./hour or less, to prevent breakage of the structures.

After prefiring, the extruded structures are next fired or "pyrolyzed" in a furnace in a gas atmosphere at a temperature of about 500° to 1400° C., preferably about 600° to 1100° C., for a period of about 1 to 24 hours. A tube furnace or a Lindberg atmosphere-controlled furnace are suitable for this purpose. When the carbon in the structure is intended to be activated, an oxidizing atmosphere such as carbon dioxide or a mixture of air with an inert gas is used. When an unactivated, or graphitized, material is desired for the final structure, an inert or reducing atmosphere, such as argon or nitrogen, is used.

The presence of high surface area in the fired product, that is, at least or above about 50 $m^2/g$, indicates that activated carbon has been formed. Preferably, surface area of the final fired product exceeds 100 $m^2/g$ and more preferably exceeds 200 $m^2/g$. In most preferred embodiment, surface area exceeds 500 m$^2$/g and can approach 1000 m$^2$/g. Generally, the firing steps yield a porous structure of about 5-70 volume % porosity (preferably 35-55 volume %) determined by nitrogen desorption measurement, which porosity aids in providing the high surface area.

EXAMPLES

The compositions indicated in Table I were admixed and extruded into honeycomb shapes according to the procedures described above. Firing of the structures was carried out in either a tube furnace or Lindberg furnace. The tube furnace was made by inserting a closed-end alumina tube in a small Harrop electric kiln. The firing rates and temperatures were controlled by an Iveron microcomputer. The tube was sealed by clamping a gasketed plate over the open end. The gases (oxidizing or reducing) were fed into the tube through a small alumina tube inserted in the seal plate. The gas exited through a port in the seal plate into a hood. The gases were monitored with a flow meter and a bubbler filled with silicone oil.

The Lindberg furnace consisted of a stainless steel box fitted with a gasketed cover with exit and entry ports for the carbon dioxide and argon gases. The gas flow was metered as in the tube furnace. The furnace was controlled by a drum data trak. The temperature capability was a little above 900° C. The availability of both a tube furnace and the Lindberg furnace provided capability to fire structures both at high temperatures and at high throughput capacity.

Physical properties such as Hg porosity, surface area, and thermal expansion of the final products were measured using standard methods known in the art.

Pre-Firing And Pyrolysis (Firing) Studies

In order to determine the optimum pre-fire temperature to burnout volatile materials yet retain the precursor carbon material, small pieces of extruded honeycombs were pre-fired for 3 hrs. at various temperatures, and weight loss associated with each temperature ("soak") was measured. FIG. 1 is a curve of percent weight loss versus burnout temperature for the composition AY-170 (as shown in Table 1). The figure shows that weight loss increased as pre-fire temperatures approached 200° C., and then remained essentially constant to 250° C. Therefore, pre-firing at a temperature up to about 250° C. is convenient to burn out volatiles.

Two extruded green bodies prepared from composition BA-170 and BB-170 (as shown in Table I) were polymerized using either HCl or methyltrichlorosilane under various conditions, as shown in Table II, to create eight different specimens. The specimens were subjected to two different pre-firing schedules, 150° C. at 3 hours and 250° C. for 3 hours, followed by final firing of 5 hours in carbon dioxide atmosphere. Results for the 150° C. pre-firing are given in Table IIA and those for the 250° C. pre-firing are given in Table IIB. These tables show that, for prefirings at 150° C., final firing above 850° C. results in weight losses of greater than 67% with occurrences of complete disintegration of the structure. For prefirings at 250° C., weight loss becomes excessive at final firing temperatures above 950° C.

Table IIC shows the effect of time at the final firing temperature for the eight different specimens of BA-170 or BB-170. In each case, the specimens were prefired at 250° C. for 3 hours in air, followed by firing in a carbon dioxide atmosphere at 900° C. for 1 hour, 6 hours, or 16 hours. As shown, firing for 6 hours is sufficient to produce a total weight loss of 52-64%, which is the maximum loss that can be tolerated. When firing times reach 16 hours, excessive weight loss or complete disintegration of the structures occurs.

In summary, these experiments indicate that strong activated carbon bodies are obtained when the green bodies are pyrolyzed at about 900° C. for up to 6 hours in a carbon dioxide atmosphere following a 3-hour pre-firing in air at temperatures below about 250° C.

Activated Carbon

Figure 2:
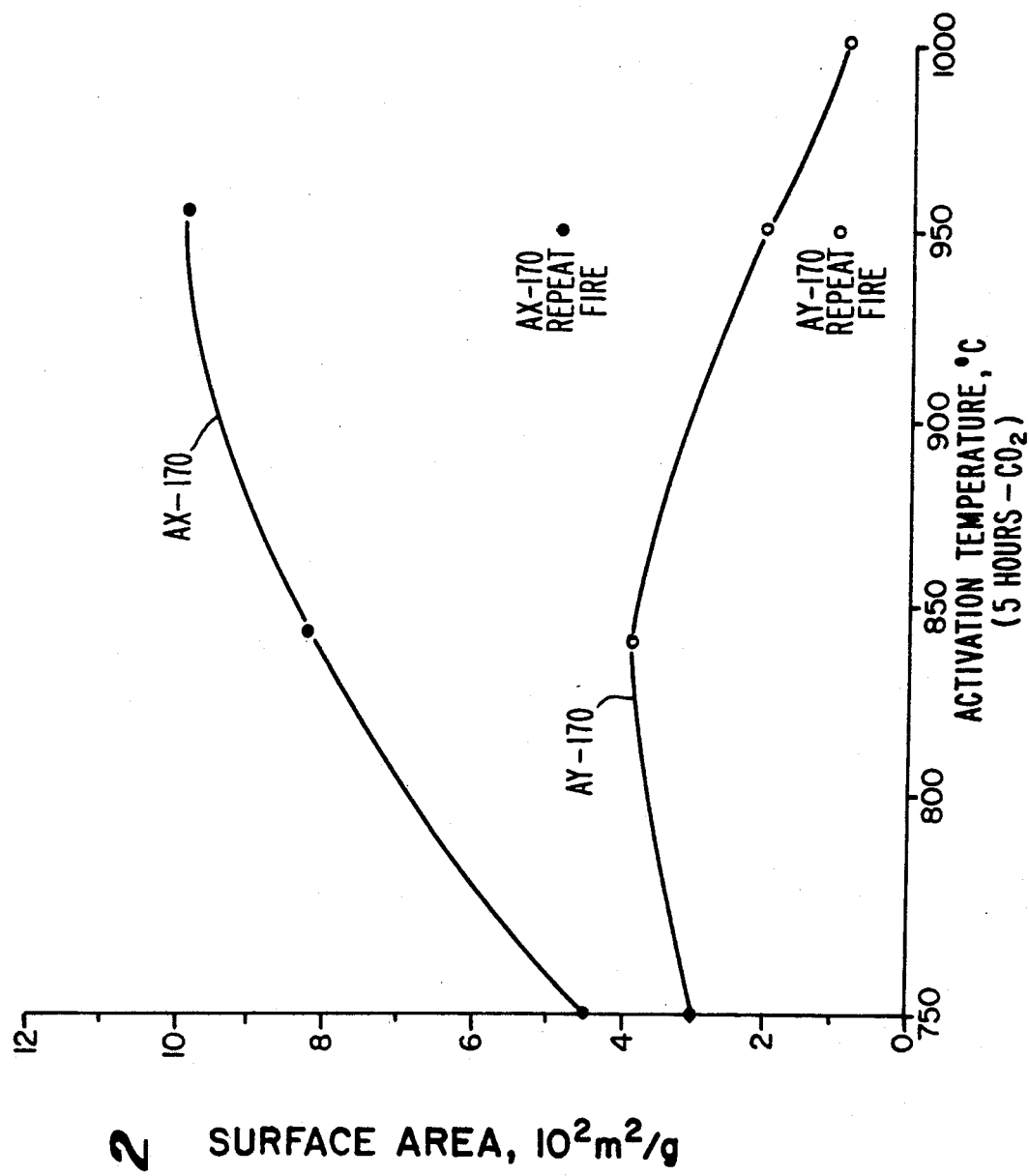
FIG. 2 is a plot of surface area versus heat-activation temperature for two samples according to the invention.
Figure 3:
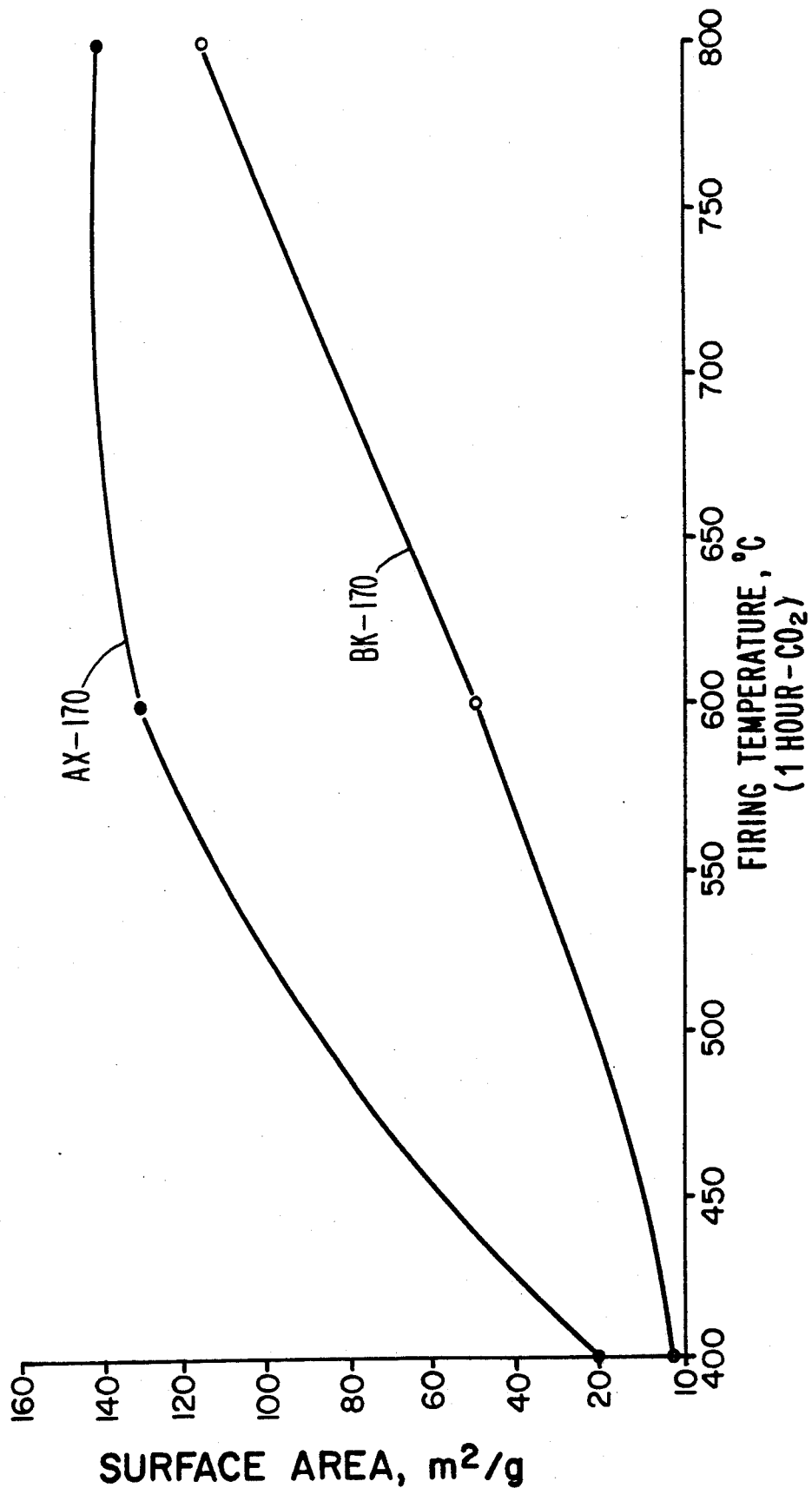
FIG. 3 is a plot of surface area versus heat-activation temperature for two samples according to the invention.

Initial experiments to develop activated carbon were performed with compositions AX-170, AY-170, and BK-170 (Table I). Batches of AX-170 and AY-170 were prepared as described above and extruded to form honeycombs having 200 square channels per square inch (31 square channels per square centimeter) with internal walls about 12 mils (0.3 mm) thick. The honeycombs were polymerized with dimethyldichlorosilane. The structures were then pre-fired at 400° C. for 6 hours in air, followed by activating heat-treatment for 5 hours in a $CO_2$ atmosphere at various temperatures between 750° C. and 1000° C. Surface area results (measured by BET) are shown in FIG. 2. AX-170 and BK-170 were also extruded to form a honeycomb having 400 square channels per square inch (62 square channels per square centimeter) and internal wall thickness of 10 mils (0.25 mm). The honeycombs were polymerized with dimethyldicholorsilane. BET surface areas of samples from these extrusions as a function of firing temperature are shown in FIG. 3. Activation heat-treatment was only one hour, and surface area results were lower than shown in FIG. 2.

Activated carbon was also made by impregnating a porous spinel with furfuryl alcohol. After polymerizing and heat treating at 950° C.-6 hrs.-$CO_2$ atmosphere, a surface area of 71 m$^2$/g was measured.

Graphite

Compositions of BC-, BD-, BG-, BH- and BI-170 (Table I) were extruded into ribbon and honeycomb shapes, polymerized, and heat treated. In all cases, the honeycombs were polymerized or cured by exposure to $CH_3Cl_3Si$ vapor, and then pre-fired and fired under the conditions indicated in Table III.

Table III lists the Hg porosity and boiling water porosity measurements on the extruded graphitic structures. Bulk density and displacement density vary from 1.26 to 1.69 gm/cc, compared to industrial grades of pure graphite, which range from about 1.40 to 1.71 gm/cc.

Thermal expansion values of the BG-170 batch were $6.4 \times 10^{-7}$/°C. (25°-500° C.), compared to values from the literature measured as that are as low as $18 \times 10^{-7}$/° C. (25°-500° C.) for extruded graphite.

TABLE I

| Composition - Parts by Wt. | | | | | | |
|---|---|---|---|---|---|---|
| Composition: 170 Series | AX- | AY- | AZ- | BA- | BB- | BK- |
| Dow Methocel MC-4000 | 10 | 10 | 10 | 10 | 10 | 4 |
| Sodium Stearate (SAN) | 0.5 | 0.5 | 0.5 | 0.5 | 0.5 | — |
| Cherry Pit Flour | 100 | 50 | 0 | 50 | 50 | 50 |
| Murray-Williams Germantown Lampblack | 0 | 50 | 100 | — | — | — |
| Fischer Lampblack #198 | — | — | — | 50 | 50 | — |
| Furfuryl Alcohol | 46 | 48 | 62 | 38 | 57 | — |
| Polyfurfuryl Alcohol | — | — | — | 38 | — | 48 |
| Columbian Carbon | — | — | — | — | — | 50 |

TABLE I-continued

| Composition - Parts by Wt. | | | | | | |
|---|---|---|---|---|---|---|
| Germantown Lampblack | | | | | | |
| Composition: 170 Series | BC- | BC- | BF- | BG- | BH- | BI- |
| Dow Methocel MC-4000 | 5 | 10 | 4 | 4 | 8 | 8 |
| Asbury Graphite #4012 | 100 | 100 | — | — | — | — |
| Superior Graphite #9026 | — | — | 100 | — | — | — |
| Lonza-KS-75 Graphite | — | — | — | 100 | — | 100 |
| Asbury Graphite #7101 | — | — | — | — | 100 | — |
| Furfuryl Alcohol | 35 | 40 | 42.5 | 40 | 40 | 40 |

TABLE II

| Specimen No. | Composition | Polymerizing Agent |
|---|---|---|
| 1 | BA-170 | HCl vapor |
| 2 | BB-170 | HCl vapor |
| 3 | BA-170 | $CH_3Cl_3Si$ vapor - 48 hrs. |
| 4 | BB-170 | $CH_3Cl_3Si$ vapor - 48 hrs. |
| 5 | BA-170 | $CH_3Cl_3Si$ vapor - 10 min. |
| 6 | BB-170 | $CH_3Cl_3Si$ vapor - 10 min. |
| 7 | BA-170 | $CH_3Cl_3Si$ liquid |
| 8 | BB-170 | $CH_3Cl_3Si$ liquid |

TABLE IIA

Percent Weight Loss: Prefired at 150° C.-3 hrs. in air and Fired 5 hrs. in $CO_2$

| Specimen/ Composition | Firing Temperature | | |
|---|---|---|---|
| | 750° C. | 850° C. | 950° C. |
| 1 BA-170 | 42.3 | 51.6 | Disintegrated |
| 2 BB-170 | 40.3 | 48.2 | Disintegrated |
| 3 BA-170 | 42.1 | 54.8 | Disintegrated |
| 4 BB-170 | 40.9 | 48.3 | 77.7 |
| 5 BA-170 | 41.0 | 47.3 | 77.7 |
| 6 BB-170 | 41.1 | 55.2 | 66.6 |
| 7 BA-170 | 40.9 | 48.3 | 71.9 |
| 8 BB-170 | 43.6 | 53.5 | Disintegrated |

TABLE IIB

Percent Weight Loss: Prefired 250° C.-3 hrs. in air and Fired 5 hrs. in $CO_2$

| Specimen/ Composition | Firing Temperature | | | |
|---|---|---|---|---|
| | 750° C. | 850° C. | 950° C. | 1050° C. |
| 1 BA-170 | 39.9 | 44.9 | 46.9 | 75.9 |
| 2 BB-170 | 39.6 | 45.6 | 50.6 | 74.1 |
| 3 BA-170 | 40.3 | 46.1 | 50.6 | 88.7 |
| 4 BB-170 | 41.1 | 43.2 | 55.4 | 86.6 |
| 5 BA-170 | 41.8 | 44.4 | 59.2 | Disintegrated |
| 6 BB-170 | 41.3 | 43.1 | 57.1 | 77.7 |
| 7 BA-170 | 40.5 | 45.9 | 55.1 | 79.6 |
| 8 BB-170 | 45.5 | 51.7 | 65.1 | Disintegrated |

While the preferred technique of forming the structure of the present invention is extrusion (e.g. as disclosed in U.S. Pat. No. 3,790,654), other suitable forming techniques can also be employed (e.g. as disclosed in U.S. Pat. Nos. 3,007,222, 3,089,195, 3,112,184, 3,444,925 and 3,755,204).

TABLE IIC

Percent Weight Loss: Prefired at 250° C.-3 hrs. in air and Fired 900° C. in $CO_2$

| Specimen/ Composition | Firing Soak Time | | |
|---|---|---|---|
| | 1 hr. | 6 hrs. | 16 hrs. |
| 1 BA-170 | 41.5 | 56.3 | 76.9 |
| 2 BB-170 | 46.7 | 63.5 | Disintegrated |
| 3 BA-170 | 39.3 | 53.8 | 63.2 |
| 4 BB-170 | 38.7 | 51.6 | 71.6 |
| 5 BA-170 | 42.2 | 55.5 | 76.5 |
| 6 BB-170 | 38.4 | 61.6 | 77.7 |
| 7 BA-170 | 39.6 | 55.8 | Disintegrated |

TABLE IIC-continued

Percent Weight Loss: Prefired at 250° C.-3 hrs. in air and Fired 900° C. in $CO_2$

| Specimen/ Composition | Firing Soak Time | | |
|---|---|---|---|
| | 1 hr. | 6 hrs. | 16 hrs. |
| 8 BB-170 | 48.0 | 60.0 | Disintegrated |

TABLE III

Hg Porosity and Boiling Water Porosity of Extruded Graphite

| Composition | Cured | Heat Treatment | % Hg Porosity |
|---|---|---|---|
| BC-170 | vapor | 1000° C. 2 hrs.-Argon (thick ribbon) | 13 |
| BD-170 | vapor | 1000° C. 2 hrs.-Argon (thin ribbon) | 20 |
| BD-170 | vapor | 1000° C. 2 hrs.-Argon (thick ribbon) | 16 |
| BG-170 | vapor | 300° C.-4 hours-air + 950° C. -3 hrs.-Argon (thin ribbon) | 27 |
| BG-170 | vapor | 300-4 hours-air + 950° C. 3 hrs.-Argon (thin ribbon) | 28 / 23 |
| BH-170 | vapor | 300° C.- 4 hours-air + 950° C.-3 hrs.-Argon | — |
| BI-170 | vapor | 300° C.-4 hrs. + 950° C. 3 hrs.-Argon (thin ribbon) | 17 |

| Composition | Med. Pore Size μm* | Disp. Density gm/cc | Skeletal Density gm/cc | % Open Porosity | Bulk Density gm/cc |
|---|---|---|---|---|---|
| BC-170 | 3 | 1.57 | 1.81 | — | — |
| BD-170 | 1.5 | 1.54 | 1.92 | — | — |
| BD-170 | 4 | 1.56 | 1.87 | — | — |
| BG-170 | 1.8 | 1.33 | 1.80 | 33 | 1.50 |
| BG-170 | 2 | 1.26 | 1.76 | — | — |
| | 1.7 | 1.43 | 1.85 | — | — |
| BH-170 | — | — | — | 20 | 1.68 |
| BI-170 | 1 | 1.48 | 1.79 | — | — |

*Distributions were generally bimodal.
M.P.S. refers to the coarse fraction of pores.

What is claimed is:

1. A method of making a structure of carbonaceous material which comprises
   (1) preparing a substantially homogenous mixture of:
      (a) carbon, carbon precursor, graphite, or mixture thereof;
      (b) binder selected from the group consisting of cellulose ether and derivative thereof, starch, and mixture thereof; and
      (c) furfuryl alcohol, polyfurfuryl alcohol, or mixture thereof;
   (2) forming the mixture into a shape of said structure;
   (3) exposing the structure to a polymerizing agent for and to polymerize said furfuryl alcohol and/or polyfurfuryl alcohol; and then
   (4) heating the structure at a temperature and for a period of time sufficient to substantially convert the polymerized furfuryl alcohol to carbon.

2. The method of claim 1 wherein said polymerizing agent is selected from the group consisting of acid and volatile molecule which can react hydrolytically with the hydroxyl moiety of the furfuryl alcohol and/or any residual water in the mixture to form an acid.

3. The method of claim 1 wherein said mixture comprises carbon, carbon precursor, or mixture thereof, and said heating step is conducted in an oxidizing atmosphere.

4. The method of claim 1 wherein said mixture comprises graphite and said heating step is conducted in a reducing atmosphere.

5. The method of claim 1 wherein the structure is thin-walled.

6. The method of claim 1 wherein the structure is in the shape of a honeycomb.

7. The method of claim 1 wherein the structure is in the shape of a ribbon.

8. The method of claim 1 wherein said binder is selected from the group consisting of methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, sodium carboxylmethylcellulose, and mixtures thereof.

9. The method of claim 8 wherein said mixture comprises methylcellulose in an amount of about 1 to 10 weight percent, and furfuryl alcohol, polyfurfuryl alcohol, or mixture thereof in an amount of about 20 to 75 weight percent.

10. The method of claim 9 wherein the carbon precursor is a nut flour, sawdust, or mixture thereof.

11. The method of claim 9 wherein the polymerizing agent is hydrogen chloride, dichloromethylsilane, methyltrichlorosilane, or dimethyldichlorosilane.

12. The method of claim 9 wherein said mixture comprises carbon, carbon precursor, or mixture thereof, and said heating step is conducted in an oxidizing atmosphere.

13. The method of claim 9 wherein said mixture comprises graphite and said heating step is conducted in the presence of argon, nitrogen, or mixture of these.

14. The method of claim 9 wherein the heating step includes pre-firing the structure resulting from step (3) in air at a temperature up to about 250° C. for a time sufficient to eliminate substantially all volatiles from said structure.

15. The method of claim 14 wherein said prefiring step is conducted at a temperature between 90° and 250° C. for a time period between 1 and 10 hours.

16. The method of claim 1, 14 or 15 wherein the heating step includes a final firing of the structure at a temperature of about 500°-1400° C. to yield a porous structure.

17. The method of claim 1 wherein said mixture further comprises up to about 75% by total weight of a filler selected from the group consisting of nitride, carbide, metal oxide, spinel, zeolite, silicon, and mixture of these.

18. The method of claim 1 wherein
(i) said binder is selected from the group consisting of cellulose ether and derivative thereof;
(ii) said binder is from about 4 to 10 weight percent of said mixture, and said alcohol component is from about 25 to 60 weight percent of said mixture;
(iii) said forming step comprises extruding the mixture to form a thin-walled honeycomb structure;
(iv) said exposing step comprises exposing the extruded structure to vapors of hydrogen chloride, dichloromethylsilane, methyltrichlorosilane, or dimethyldichlorosilane for a time sufficient to substantially completely polymerize the furfuryl alcohol; and
(v) said heating step comprises prefiring said extruded structure at a temperature of about 90°-250° C. for a time sufficient to eliminate substantially all volatile components from said structure, and heating said prefired structure in a gas atmosphere at a temperature of from about 500°-1,400° C. for a period of about 1-24 hours.

19. The method of claim 18 wherein said mixture comprises carbon or carbon precursor, and said heating step is performed in the presence of carbon dioxide.

20. The method of claim 19 wherein said mixture further comprises up to about 75% by total weight of a filler selected from the group consisting of nitride, carbide, metal oxide, spinel, zeolite, silicon, and mixture of these.

21. The method of claim 18 wherein said binder is selected from the group consisting of methylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, sodium carboxylmethylcellulose, and mixture thereof.

22. The method of claim 1 whereby said heating step forms a structure having an Hg porosity of about 13-28%.

23. The method of claim 18 whereby said heating step forms a structure having an Hg porosity of about 13-28%.

* * * * *